(12) United States Patent
Yamagata et al.

(10) Patent No.: US 9,037,003 B2
(45) Date of Patent: May 19, 2015

(54) SIGNAL TRANSMISSION DEVICE

(71) Applicant: YAZAKI CORPORATION, Tokyo (JP)

(72) Inventors: Chiemi Yamagata, Shizuoka (JP); Atsushi Nakata, Shizuoka (JP); Kengo Noguchi, Kanagawa (JP); Yukio Akazawa, Kanagawa (JP)

(73) Assignee: YAZAKI CORPORATION, Tokyo (JP)

( * ) Notice: Subject to any disclaimer, the term of this patent is extended or adjusted under 35 U.S.C. 154(b) by 127 days.

(21) Appl. No.: 13/851,072

(22) Filed: Mar. 26, 2013

(65) Prior Publication Data

US 2013/0216237 A1  Aug. 22, 2013

Related U.S. Application Data

(63) Continuation of application No. PCT/JP2011/072183, filed on Sep. 28, 2011.

(30) Foreign Application Priority Data

Sep. 28, 2010  (JP) .................................. 2010-216423

(51) Int. Cl.
*H04B 10/00* (2013.01)
*H04B 10/564* (2013.01)
*H04B 10/50* (2013.01)

(52) U.S. Cl.
CPC .............. *H04B 10/564* (2013.01); *H04B 10/50* (2013.01)

(58) Field of Classification Search
USPC ................................................. 398/192–198
See application file for complete search history.

(56) References Cited

U.S. PATENT DOCUMENTS 5,043,992 A * 8/1991 Royer et al. ..................... 372/34
5,844,928 A * 12/1998 Shastri et al. .............. 372/38.02
6,917,639 B2 * 7/2005 Ishida et al. ............... 372/38.02

(Continued)

FOREIGN PATENT DOCUMENTS

EP    1085624 A1    3/2001
JP    07-111355 A    4/1995

(Continued)

OTHER PUBLICATIONS

Japanese Office Action for the related Japanese Patent Application No. 2010-216423 dated Jun. 17, 2014.

(Continued)

*Primary Examiner* — Agustin Bello
(74) *Attorney, Agent, or Firm* — Kenealy Vaidya LLP

(57) ABSTRACT

A signal transmission device drives a light-emitting element and outputs an optical signal depending on a data signal from an electronic device. The device includes an element driving portion which supplies a driving current to the light-emitting element, wherein the driving current is obtained by superimposing a modulation current on a bias current, the modulation current being dependent on the data signal indicating emitting information of the light-emitting element. A temperature compensation portion of the device controls the bias current and the modulation current depending on the temperature so that a temperature-current characteristic of the light-emitting element is reproduced based on the voltage which is dependent on the temperature and the voltage which is independent from the temperature, thereby performing current control depending on the temperature.

5 Claims, 5 Drawing Sheets

(56) References Cited

U.S. PATENT DOCUMENTS

| | | | |
|---|---|---|---|
| 8,023,541 B2 * | 9/2011 | Nishimura et al. | 372/34 |
| 2009/0135866 A1 * | 5/2009 | Nishimura et al. | 372/34 |
| 2013/0216237 A1 * | 8/2013 | Yamagata et al. | 398/192 |

FOREIGN PATENT DOCUMENTS

| | | |
|---|---|---|
| JP | 2007-324493 A | 12/2007 |
| JP | 2009-141448 A | 6/2009 |
| WO | WO2007/102236 A1 | 9/2007 |

OTHER PUBLICATIONS

International Preliminary Report on Patentability and English translation of Written Opinion of the International Searching Authority for PCT/JP2011/072183.

International Search Report for PCT/JP2011/072183 and Form PCT/ISA/237 dated Dec. 20, 2011, with English translation of the ISR.

Chinese Office Action and Search Report for the related Chinese Patent Application No. 201180046924.X dated Jan. 6, 2015.

* cited by examiner (a)

(b)

(c)

(a)

(b)

(a)

(b)

(c)

SIGNAL TRANSMISSION DEVICE

CROSS REFERENCE TO RELATED APPLICATION

This application is a continuation of PCT application No. PCT/JP2011/072183, which was filed on Sep. 28, 2011 based on Japanese Patent Application (No. 2010-216423) filed on Sep. 28, 2010, the contents of which are incorporated herein by reference.

BACKGROUND OF THE INVENTION

1. Technical Field

The present invention relates to a signal transmission device for performing data transmission.

2. Background Art

Recently, a technique in which data transmission between a variety of electronic devices mounted on a vehicle, such as an automobile, is performed by an optical cable is known. The electronic devices connected by the optical cable have connectors for connecting the optical cable, and the connector has a photoelectric conversion module referred to as FOT (Fiber Optic Transceiver). The photoelectric conversion module performs conversion between an optical signal and an electric signal.

For example, the photoelectric conversion module having a transmission function essentially consists of a light-emitting element and an element driving IC. In this case, the element driving IC functions as a signal transmission device for performing data transmission, and outputs an optical signal depending on an electric signal, which is a data signal from a control circuit of the electronic devices, by driving the light-emitting element.

In this photoelectric conversion module, because the output power and the extinction ratio of the light-emitting element are varied depending on a temperature, it is necessary to control a current value depending on the temperature by the element driving IC to keep constantly the output power and the extinction ratio (i.e., temperature compensation). For example, a light-emitting device having a function of temperature compensation of a light-emitting element is disclosed in JP-A-2007-324493. For the light-emitting device, a temperature signal detected by a temperature compensation circuit is inputted to an input terminal of a power supply circuit. Accordingly, the power supply circuit is configured to decrease an output voltage thereof depending on a temperature signal indicating that an increase of an ambient temperature is detected, and contrarily, to increase the output voltage depending on a temperature signal indicating that a decrease of the ambient temperature is detected.

SUMMARY OF THE INVENTION

However, according to the technique disclosed in JP-A-2007-324493, because a thermistor is used as the temperature compensation circuit, there is a problem in that the number of components to be mounted increases, thereby increasing the size of the device.

The present invention has been made keeping in mind the above problem, and an object of the present invention is to provide a signal transmission device which achieves temperature compensation of a light-emitting element by a simple configuration without increasing the size of the device.

To solve this object, the present invention provides a signal transmission device for driving a light-emitting element and outputting an optical signal depending on an electric signal, which is a data signal from an electronic device.

The signal transmission device according to the present invention includes: an element driving portion which supplies a driving current to the light-emitting element, wherein the driving current is obtained by superimposing a modulation current on a bias current, the modulation current being dependent on the data signal indicating emitting information of the light-emitting element; a first voltage generation portion which generates a voltage depending on a temperature; a second voltage generation portion which generates a predetermined voltage regardless of the temperature; and a temperature compensation portion which controls the bias current and the modulation current depending on the temperature. The temperature compensation portion reproduces a temperature-current characteristic of the light-emitting element based on the voltage applied from the first voltage generation portion and the voltage applied from the second voltage generation portion, thereby performing current control depending on the temperature.

Here, in the signal transmission device according to the present invention, it is preferable that the temperature-current characteristic of the light-emitting element is represented by a straight line having a negative gradient on a lower temperature side relative to a change-point as a boundary and a positive gradient on a higher temperature side relative to the change-point or by a straight line having a positive gradient on a lower temperature side relative to a change-point as a boundary and a negative gradient on a higher temperature side relative to the change-point.

Further, in the signal transmission device according to the present invention, it is desirable that the temperature compensation portion performs an amplifying process, an inverting process and an combining process on each of the voltage applied from the first voltage generation portion and the voltage applied from the second voltage generation portion, thereby reproducing the temperature-current characteristic of the light-emitting element.

Moreover, in the signal transmission device according to the present invention, it is preferable that a plurality of temperature compensation portions are provided in correspondence with light-emitting devices having different characteristics; and an arbitrary temperature compensation portion of the plurality of temperature compensation portions is selectively usable.

The signal transmission device according to the present invention has a function of generating a constant voltage regardless of a temperature and a voltage varied depending on the temperature and thus can reproduce a temperature-current characteristic of a light-emitting element on the basis of such two types of voltages. As a result, because there is no need to use a thermistor or the like, temperature compensation of the light-emitting element can be achieved by a simple and compact configuration.

DETAILED DESCRIPTION OF THE EXEMPLARY EMBODIMENTS

Figure 1:
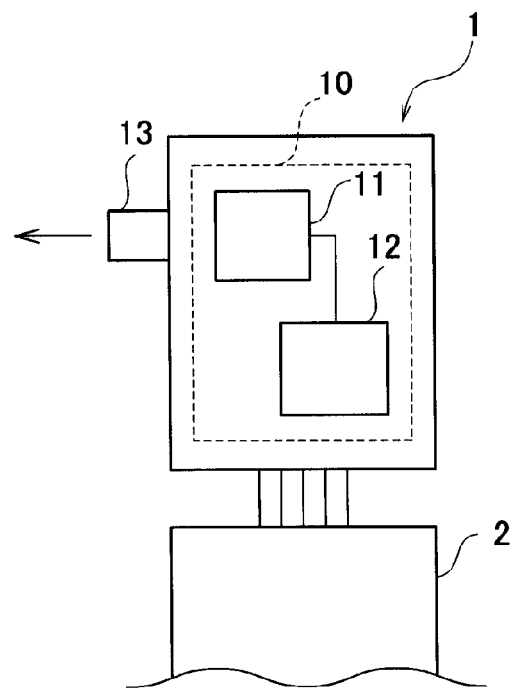
FIG. 1 is a block diagram schematically showing a configuration of an optical connector 1.

FIG. 1 is a block diagram schematically showing a configuration of an optical connector 1 according to an embodiment of the present invention. The optical connector 1 according to the present embodiment is, for example, a receptacle type female optical connector used in an optical communication field. This optical connector 1 is provided in a variety of electronic devices, such as a display or a navigation system, and is electrically connected to a printed circuit board 2 included in the electronic devices. For example, the optical connector 1 is connected with a male optical connector having an optical cable attached thereon, thereby enabling to perform large-capacity optical communication between electronic devices.

The optical connector 1 includes a photoelectric conversion module 10 referred to as FOT (Fiber Optic Transceiver). The photoelectric conversion module 10 has a plurality of lead terminals extended from a metallic lead frame and soldered on the printed circuit board 2 included in the electronic devices.

Also, the optical connector 1 includes the photoelectric conversion module 10 (in particular, a light-emitting element 11 as described below), and a sleeve 13 as an optical component interposed between surfaces of a ferrule end (surfaces of an optical cable end) of the male optical connector. The sleeve 13 consists of a light guide member molded by a transparent material having a light transmittance and a cylindrical portion provided around the light guide member.

The photoelectric conversion module 10 essentially consists of the light-emitting element 11 and an element driving IC 12. The light-emitting element 11 and the element driving IC 12 are respectively mounted on the metal lead frame of electrical conductivity in a wire-bonded state.

The light-emitting element 11 outputs an optical signal to the optical cable. For example, a semiconductor laser can be used as the light-emitting element 11. Namely, the optical connector 1 according to the present embodiment is configured as a transmitting connector for transmitting an optical signal via the optical cable.

In addition to the light-emitting element 11 and the element driving IC 12 therefor, the photoelectric conversion module 10 may further include a light-receiving element and an element driving IC therefor and thus may be configured to enable transmitting and receiving of optical signals.

Figure 2:
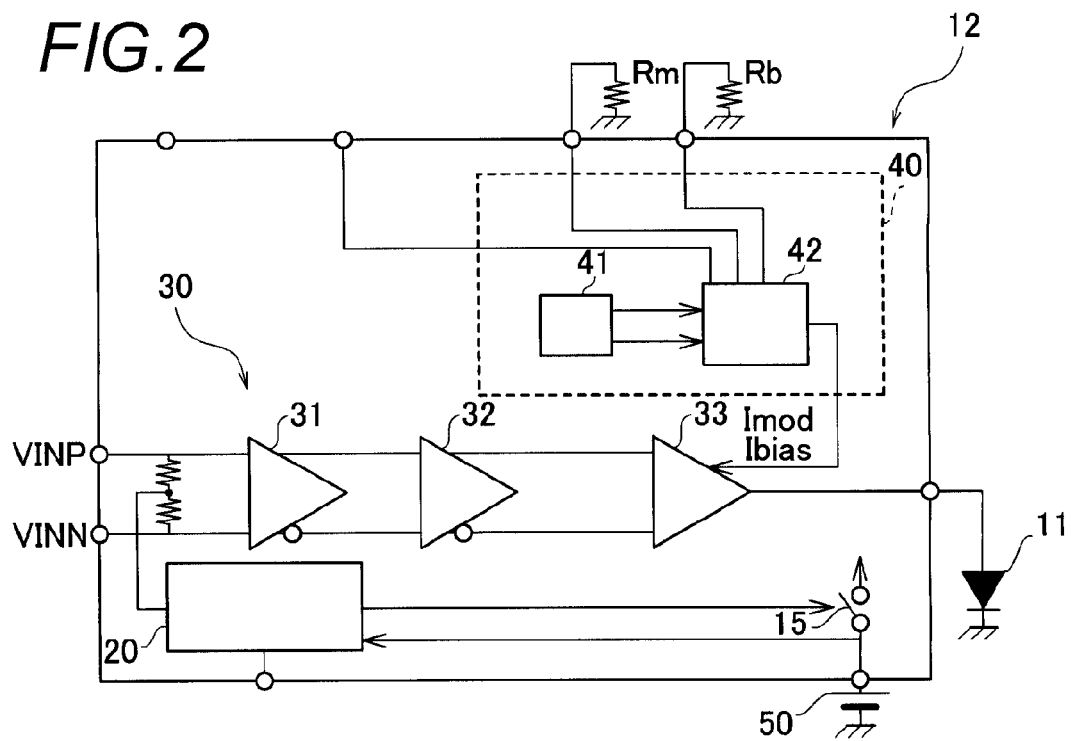
FIG. 2 is a block configuration diagram schematically showing an element driving IC 12.

FIG. 2 is a block configuration diagram schematically showing the element driving IC 12. The element driving IC 12 drives the light-emitting element 11 to perform data transmission between a control circuit (the printed circuit board 12) of the electronic device and the optical cable. Specifically, the element driving IC 12 drives the light-emitting element 11 depending on data signals VINP and VINN which are electric signals from the control circuit of the electronic device, and as a result, outputs an optical signal depending on the data signals VINP and VINN from the light-emitting element 11. In light of the functions, the element driving IC 12 includes a power management unit 20 and a main control unit 30.

In this case, the power management unit 20 and the main control unit 30 are functionally separated from each other and also respectively have power supply systems independent from each other. Specifically, a switch 15 is provided on a power supply line for supplying an operation power from a power supply portion 50 to the main control unit 30. The switch 15 is turned on/off, and thus the main control unit 30 can be powered on/off. The main control unit 30 is powered on when the switch 15 is on, and the main control unit 30 is powered off when the switch 15 is off. Meanwhile, a power supply line for supplying an operation power from the power supply portion 50 to the power management unit 20 is set to be on. Namely, the power management unit 20 is different from the main control unit 30 in that the power management unit 20 is normally set to an operation state.

The power management unit 20 manages power on/off for the main control unit 30 on the basis of the data signals VINP and VINN. Specifically, if the power management unit 20 determines that the data signals VINP and VINN have been inputted, the power management unit 20 controls the switch 15 to be turned on. Also, if the power management unit 20 determines that the data signals VINP and VINN have not been inputted during a predetermined period of time after controlling the switch 15 to be turned on, the power management 20 controls the switch 15 to be turned from on to off.

The main control unit 30 is a unit for mainly performing data transmission, and specifically outputs an optical signal from the light-emitting element 11 on the basis of the date signals VINP and VINN. The main control unit 30 essentially consists of a receiving portion 31, a butter portion 32, an element driving portion 33, and a current generation portion 40.

The receiving portion 31 receives the data signals VINP and VINN outputted from the control circuit (the printed circuit board 2) of the electronic device. As a data transmission specification between the receiving portion 31 and the control circuit of the electronic device, LVDS (Low Voltage Differential Signaling) suitable for high speed digital signal transmission can be used. LVDS applies different voltages to a pair of transmission lines to perform signal transmission using a voltage difference between the transmission lines. Namely, the receiving portion 31 receives the date signals VINP and VINN respectively through the pair of transmission lines. The date signals VINP and VINN received by the receiving portion 31 is outputted to the element driving portion 33 through the buffer portion 32.

The element driving portion 33 drives the light-emitting element 11, thereby outputting an optical signal depending on the date signals VINP and VINN. Specifically, the element driving portion 33 supplies an emitting information of the light-emitting element 11, i.e., a driving current, in which a modulation current $I_{mod}$ depending on the data signals VINP and VINN is superimposed with a bias current $I_{bias}$, to the light-emitting element 11. The bias current $I_{bias}$ and the modulation current $I_{mod}$ are supplied from the current generation portion 40.

Figure 3:
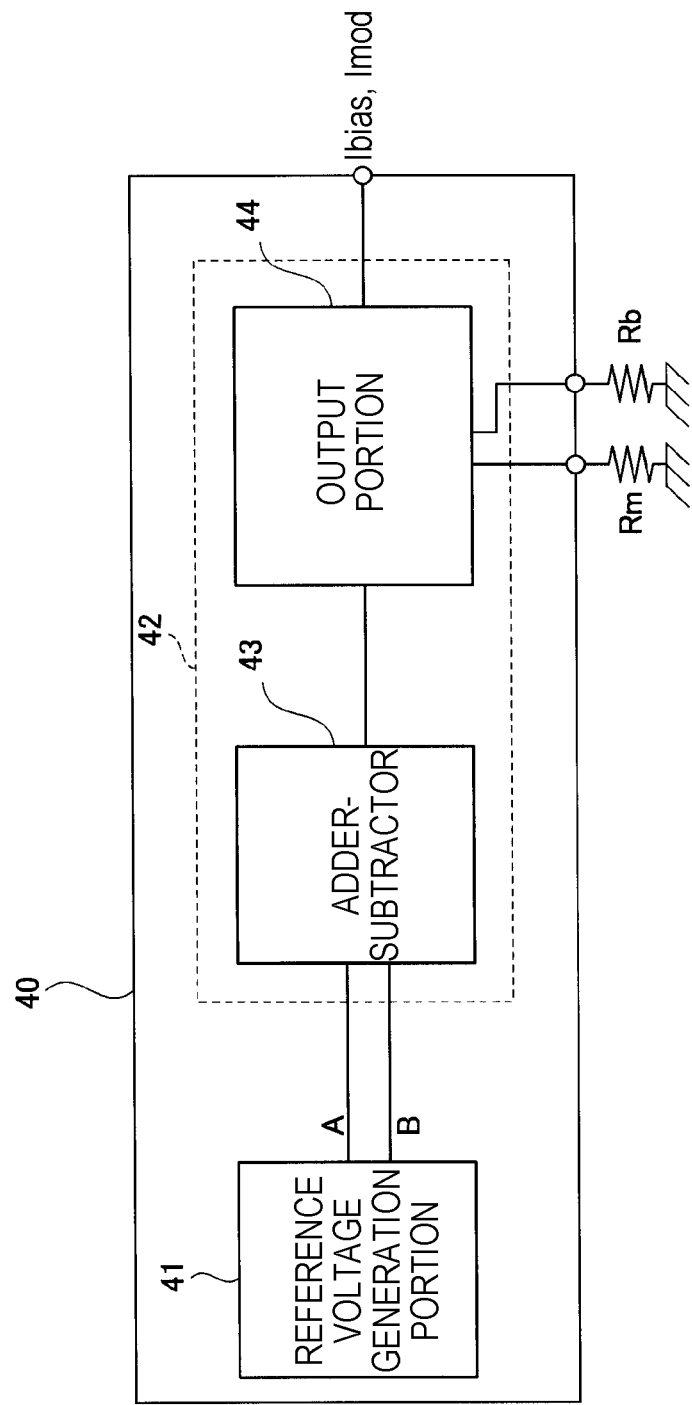
FIG. 3 is a block diagram schematically showing a configuration of a current generation portion 40.

FIG. 3 is a block diagram showing a configuration of the current generation portion 40. The current generation portion 40 has a temperature compensation function for the light-emitting element 11, and controls the bias current $I_{bias}$ and the modulation current $I_{mod}$ depending on a temperature. This current generation portion 40 includes a reference voltage generation portion 41 and a temperature compensation portion 42.

Figure 4:
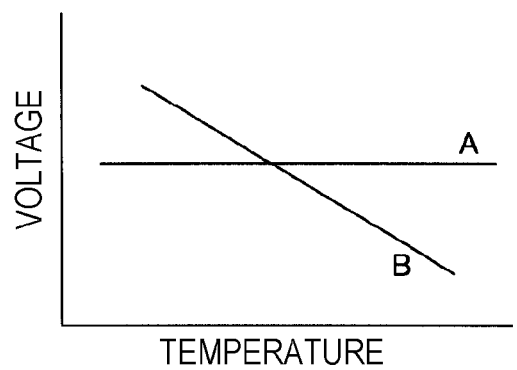
In FIG. 4, (a) to (c) are explanatory views showing a concept of temperature compensation.
Figure 4:
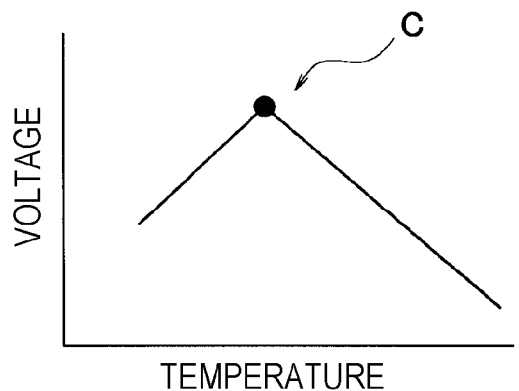
Figure 4:
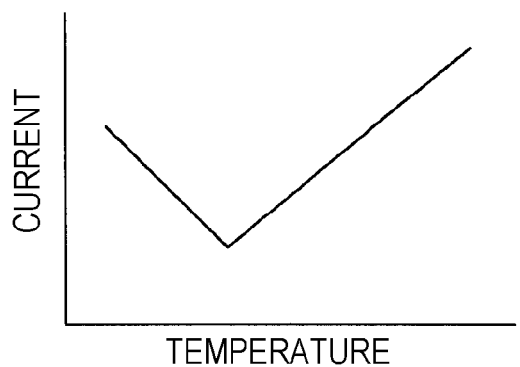

The reference voltage generation portion 41 generates two types of voltages A and B required for current control associated with temperature compensation (first and second voltage generation portion). One voltage A generated by the reference voltage generation portion 41 tends to have a constant value regardless of the temperature. Contrarily, the other voltage B generated by the reference voltage generation portion 41 tends to be varied depending on the temperature (an ambient atmosphere temperature), and specifically has a proportional relation in which the higher the temperature, the lower the voltage value is. In this regard, FIGS. 4(a) to 4(c) are explanatory views showing a concept of temperature compensation, and FIG. 4(a) shows a relation between the voltages A and B by the reference voltage generation portion 41 and the temperature.

The temperature compensation portion 42 reproduces a temperature-current characteristic of the light-emitting element 11 on the basis of two types of voltages A and B applied from the reference voltage generation portion 41, thereby performing current control depending on the temperature (temperature compensation by the current). According to the present embodiment, the temperature-current characteristic of the light-emitting element 11 is represented by a straight line having a negative gradient on a lower temperature side relative to a change-point as a boundary and a positive gradient on the higher temperature side. In light of the functions, the temperature compensation portion 42 includes an adder-subtractor 43 and an output portion 44.

Figure 5:
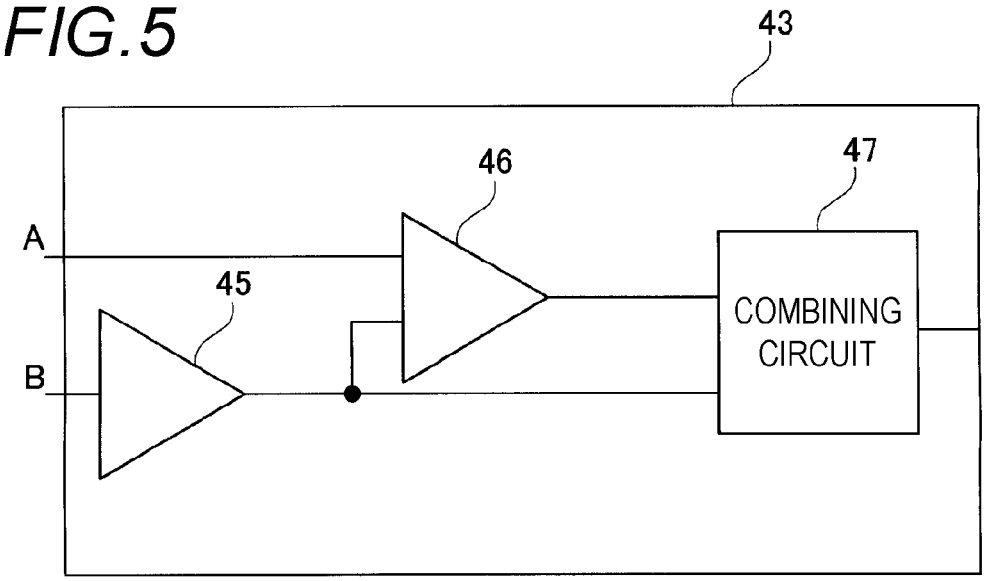
FIG. 5 is a block diagram showing a configuration of an adder-subtractor 43.

FIG. 5 is a block diagram showing a configuration of the adder-subtractor 43. The adder-subtractor 43 consists of an amplifier circuit 45 for performing an amplifying process by employing the voltage B as an object to be processed, an amplifier circuit 46 for performing an amplifying process by employing the voltage A as an object to be processed or for inverting and outputting the voltage A in comparison with the voltage B, and a combining circuit 47 for combining (adding or subtracting) the voltages A and B from the amplifier circuits 45 and 46. Namely, the adder-subtractor 43 performs each of the amplifying process, the inverting process and the combining process by employing each of two types of voltages A and B generated by the reference voltage generation portion 41 as an object to be processed. By each of such processes, a temperature-voltage characteristic of the light-emitting element 11 represented by a straight line having a positive gradient on a lower temperature side relative to a change-point C as a boundary and a negative gradient on the higher temperature side is reproduced (see FIG. 4(b)), and the adder-subtractor 43 outputs a predetermined voltage corresponding to a temperature.

Figure 6:
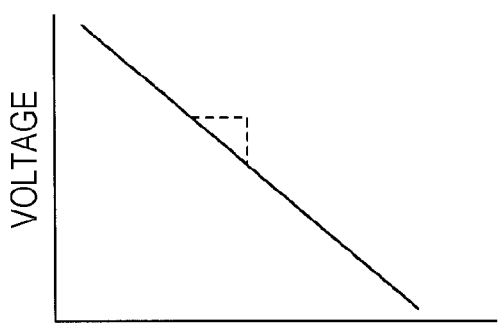
In FIG. 6, (a) and (b) are explanatory views showing a function of the addition-subtraction unit 43.
Figure 6:
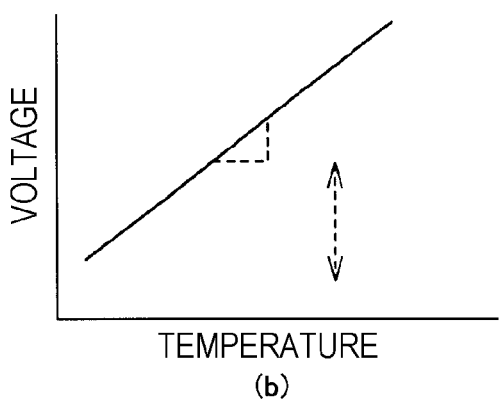

In this case, as shown in FIG. 6(a), by setting a gain of the amplifier circuit 45 to which the voltage B is inputted, a gradient of a straight line on the higher temperature side, i.e., the higher temperature side relative to the infection point C can be set. Also, as shown in FIG. 6(b), by setting a gain of the amplifier circuit 46 to which the voltage A is inputted, a location of the change-point C in an upward and downward direction (a location in a direction of voltage magnitude) and a gradient of a straight line on the lower temperature side relative to the infection point C can be set. For the gain of each of the amplifier circuit 45 and 46, an optimal value thereof is previously set through experiments or simulations, from the viewpoint of obtaining the temperature-current characteristic (see FIG. 4(c)) in consideration of the temperature compensation of the light-emitting element 11 as described below.

The output portion 44 converts between voltage and current to induce the temperature-current characteristic from the temperature-voltage characteristic, thereby generating the bias current $I_{bias}$ and the modulation current $I_{mod}$ in consideration of the temperature compensation of the light-emitting element 11. Because of such a conversion by the output portion 44, the temperature-current characteristic of the light-emitting element 11 represented by a straight line having a negative gradient on a lower temperature side relative to the change-point as a boundary and a positive gradient on the higher temperature side is reproduced as shown in FIG. 4(c).

Thus, according to the present embodiment, the element driving IC 12 includes the reference voltage generation portion 41 for generating a predetermined voltage A and a voltage B depending on a temperature, and the temperature compensation portion 42 for controlling the bias current $I_{bias}$ and the modulation current $I_{mod}$ depending on the temperature. The temperature compensation portion 42 reproduces the temperature-current characteristic of the light-emitting element 11 represented by a straight line, of which a gradient is changed from negative to positive at a change-point as a boundary, on the basis of the voltages A and B applied from the reference voltage generation portion 41, thereby performing current control depending on a temperature.

Because the output power and the extinction ratio of the light-emitting element 11 are varied depending on a temperature, it is necessary to control a current value depending on the temperature to keep constantly the output power and the extinction ratio (temperature compensation). For this temperature compensation, it is important to reproduce a temperature-current characteristic of the light-emitting element 11. For example, the temperature-current characteristic of the light-emitting element 11 has a negative temperature inclination on a lower temperature side relative to a change-point as a boundary and a sharp positive temperature inclination on the higher temperature side.

Thus, by including the reference voltage generation portion 41 for generating the voltage A, which is a constant voltage, and the voltage B varied depending on the temperature, the temperature-current characteristic as described above can be reproduced on the basis of such two types of voltages A and B. As a result, because there is no need to use a thermistor or the like, temperature compensation of the light-emitting element 11 can be achieved by a simple and compact configuration.

Also, according to the present embodiment, the temperature compensation portion 42 performs each of the amplifying process, the inverting process and the combining process by employing each of the voltages A and B applied from the reference voltage generation portion 41 as an object to be processed, thereby reproducing the temperature-current characteristic of the light-emitting element. As a result, the temperature-current characteristic of the light-emitting element 11 having a negative temperature inclination on the lower temperature side and a positive temperature inclination on the higher temperature side can be unambiguously obtained from two reference voltages A and B. Therefore, the temperature compensation of the light-emitting element 11 can be achieved in a simple manner without needing complex configurations, such as map calculation with reference to output values of the thermistor.

Meanwhile, although only one temperature compensation portion 42 is provided in the foregoing embodiment, a plurality of temperature compensation portions 42 may be provided. In this case, an individual temperature compensation portion 41 can previously set each of the amplifying process, the inverting process and the combining process to correspond to numerous light-emitting elements 11 capable of being mounted, thereby preparing the temperature compensation portions 42 capable of corresponding to numerous light-emitting elements 11. Also, in the case of such a configuration, selection of the individual temperature compensation portion 42 is preferably achieved from the outside depending on selection of PAD wirings. Therefore, the element driving IC 12 does not need to be redesigned depending on the light-emitting elements 11 and also the device having excellent generality can be provided.

Also, according to the foregoing embodiment, as the temperature-current characteristic of the light-emitting element, a form represented by a straight line having a negative gradient (temperature inclination) on a lower temperature side relative to a change-point as a boundary and a positive gradient (temperature inclination) on the higher temperature side has been exemplified. However, because the temperature-current characteristic of the light-emitting element takes numerous forms depending on features of the associated light-emitting element, the invention is not limited to such a form.

Figure 7:
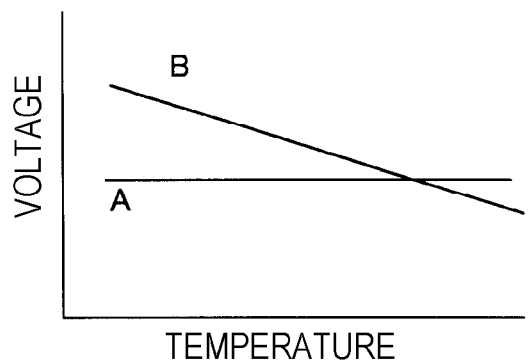
In FIG. 7, (a) to (c) are explanatory views showing a concept of temperature compensation.
Figure 7:
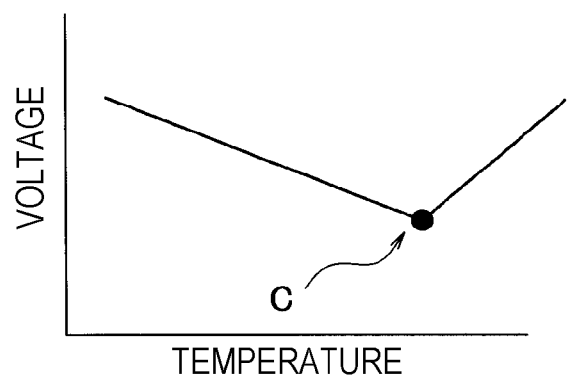
Figure 7:
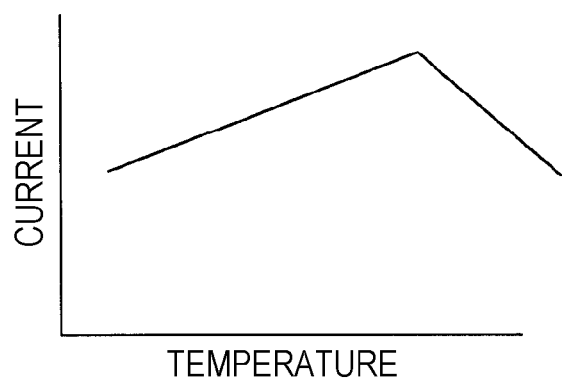

For example, as shown in FIGS. 7(a) to 7(c), by setting each of a gain of the amplifier circuit 45 to which the voltage B is inputted and a gain of the amplifier circuit 46 to which the voltage A is inputted, a temperature-voltage characteristic of the light-emitting element represented by a straight line having a negative gradient on a lower temperature side relative to a change-point C as a boundary and a positive gradient on the higher temperature side can be reproduced (see FIG. 7(b)). As a result, as shown in FIG. 7(c), a temperature-current characteristic of the light-emitting element represented by a straight line having a positive gradient on a lower temperature side relative to a change-point as a boundary and a negative gradient on the higher temperature side can be reproduced.

In addition, the invention is not limited to forms as described above, but can perform the temperature compensation on the basis of numerous temperature-current characteristics of the light-emitting element reproduced by setting each of a gain of the amplifier circuit 45 to which the voltage B is inputted and a gain of the amplifier circuit 46 to which the voltage A is inputted. Specifically, the temperature-current characteristic of the light-emitting element is sufficient if a temperature-current characteristic of the light-emitting element represented by a straight line having a first gradient on a lower temperature side relative to a change-point as a boundary and a second gradient on the higher temperature side can be reproduced. In this case, the first gradient on the lower temperature side may be any one of a positive gradient, a zero gradient and a negative gradient, and the second gradient on the higher temperature side may be any one of a positive gradient, a zero gradient and a negative gradient. Also, the present invention can be applied to a light-emitting element having a temperature-current characteristic constituted of any combination of the first gradient and the second gradient.

Although the present invention has been described with referenced to the detailed and specific embodiment, it should be apparent to those skilled in the art that numerous changes and modifications can be made without departing the scope and spirit of the present invention.

The signal transmission device according to the present invention has a function of generating a constant voltage regardless of a temperature and a voltage varied depending on the temperature and thus can reproduce a temperature-current characteristic of a light-emitting element on the basis of such two types of voltages. As a result, because there is no need to use a thermistor or the like, temperature compensation of the light-emitting element can be achieved by a simple and compact configuration.

What is claimed is:

1. A signal transmission device for driving a light-emitting element and outputting an optical signal depending on an electric signal, which is a data signal from an electronic device, the signal transmission device comprising:
    an element driving portion which supplies a driving current to the light-emitting element, wherein the driving current is obtained by superimposing a modulation current on a bias current, the modulation current being dependent on the data signal indicating emitting information of the light-emitting element;
    a first voltage generation portion which generates a voltage depending on a temperature, wherein the generated voltage will compensate for both high and low temperatures and is derived from a single current source, being inversely proportional to the temperature;
    a second voltage generation portion which generates a predetermined voltage regardless of the temperature; and
    a temperature compensation portion which controls the bias current and the modulation current depending on the temperature, wherein
    the temperature compensation portion reproduces a temperature-current characteristic of the light-emitting element based on the voltage applied from the first voltage generation portion and the voltage applied from the second voltage generation portion, thereby performing current control depending on the temperature.

2. The signal transmission device according to claim 1, wherein
    the temperature-current characteristic of the light-emitting element is represented by a straight line having a negative gradient on a lower temperature side relative to a change-point as a boundary and a positive gradient on a higher temperature side relative to the change-point.

3. The signal transmission device according to claim 1, wherein
    the temperature-current characteristic of the light-emitting element is represented by a straight line having a positive gradient on a lower temperature side relative to a change-point as a boundary and a negative gradient on a higher temperature side relative to the change-point.

4. The signal transmission device according to claim 1, wherein
    the temperature compensation portion performs an amplifying process, an inverting process and an combining process on each of the voltage applied from the first voltage generation portion and the voltage applied from the second voltage generation portion, thereby reproducing the temperature-current characteristic of the light-emitting element.

5. The signal transmission device according to claim 1, wherein
    a plurality of temperature compensation portions are provided in correspondence with light-emitting devices having different characteristics; and
    an arbitrary temperature compensation portion of the plurality of temperature compensation portions is selectively usable.

* * * * *